United States Patent
Hashiguchi et al.

(10) Patent No.: US 7,339,672 B2
(45) Date of Patent: Mar. 4, 2008

(54) SOLID-STATE IMAGE PICKUP DEVICE AND SIGNAL READING METHOD THEREFOR

(75) Inventors: Kazuo Hashiguchi, Nara-ken (JP); Makoto Shoho, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 404 days.

(21) Appl. No.: 11/031,181

(22) Filed: Jan. 7, 2005

(65) Prior Publication Data
US 2005/0151060 A1 Jul. 14, 2005

(30) Foreign Application Priority Data
Jan. 9, 2004 (JP) ............................. P2004-003915

(51) Int. Cl.
*G01B 11/00* (2006.01)
(52) U.S. Cl. .................. 356/394; 250/206; 250/208.1
(58) Field of Classification Search ................ 356/394; 250/208.1, 206, 214 R; 348/307, 308, 294, 348/295, 301, 302; 396/322; 382/312, 317, 382/276, 305
See application file for complete search history.

(56) References Cited

U.S. PATENT DOCUMENTS

| | | | |
|---|---|---|---|
| 5,912,703 A * | 6/1999 | Tamayama | 348/241 |
| 6,088,490 A | 7/2000 | Iwata et al. | |
| 6,097,022 A * | 8/2000 | Merrill et al. | 250/208.1 |
| 6,211,510 B1 * | 4/2001 | Merrill et al. | 250/208.1 |
| 2005/0051707 A1 * | 3/2005 | Bamji et al. | 250/214 R |
| 2006/0192870 A1 * | 8/2006 | Shoho et al. | 348/294 |

FOREIGN PATENT DOCUMENTS

| | | |
|---|---|---|
| JP | 58-179068 | 10/1983 |
| JP | 05-244411 | 9/1993 |
| JP | 10-269345 | 10/1998 |
| JP | 2001-203936 | 7/2001 |
| JP | 2002-232785 | 8/2002 |
| JP | 2005198149 A * | 7/2005 |

* cited by examiner

*Primary Examiner*—Roy M. Punnoose
(74) *Attorney, Agent, or Firm*—David C. Conlin; Steven M. Jensen; Edwards Angell Palmer & Dodge LLP

(57) ABSTRACT

A solid-state image pickup device has a photoelectric conversion part performing photoelectric conversion on incident light, a comparison part connected to an output terminal of the photoelectric conversion part to compare an output voltage of the photoelectric conversion part with a reference voltage, a capacitive element having one end connected to the output terminal of the photoelectric conversion part, and a control line connected to the other end of the capacitive element. In a signal storage period, a first control voltage is applied to the control line so as to make an electric potential at the output terminal of the photoelectric conversion part fall outside a transition region of the comparator. In a signal read period, a second control voltage is applied to the control line so as to make the electric potential at the output terminal of the photoelectric conversion part fall within the transition region of the comparator.

15 Claims, 5 Drawing Sheets

*Fig.5A*   *Fig.5B*
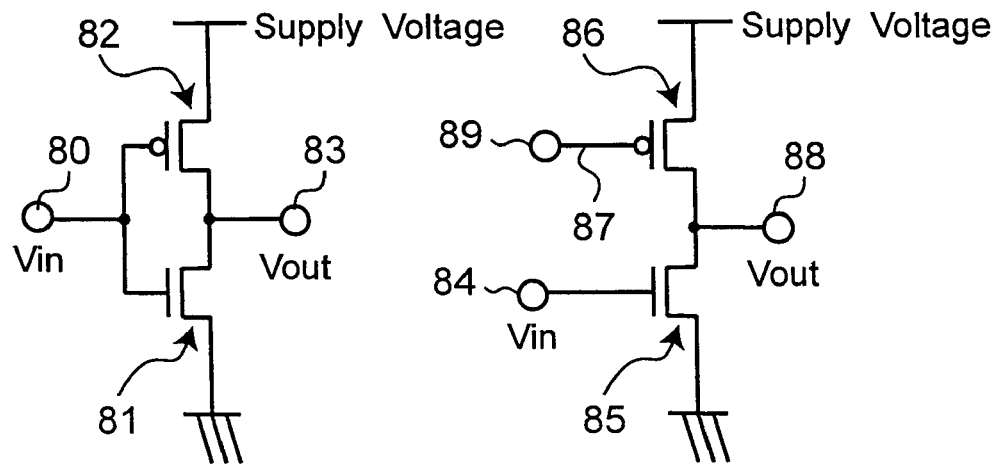
*Fig.6*
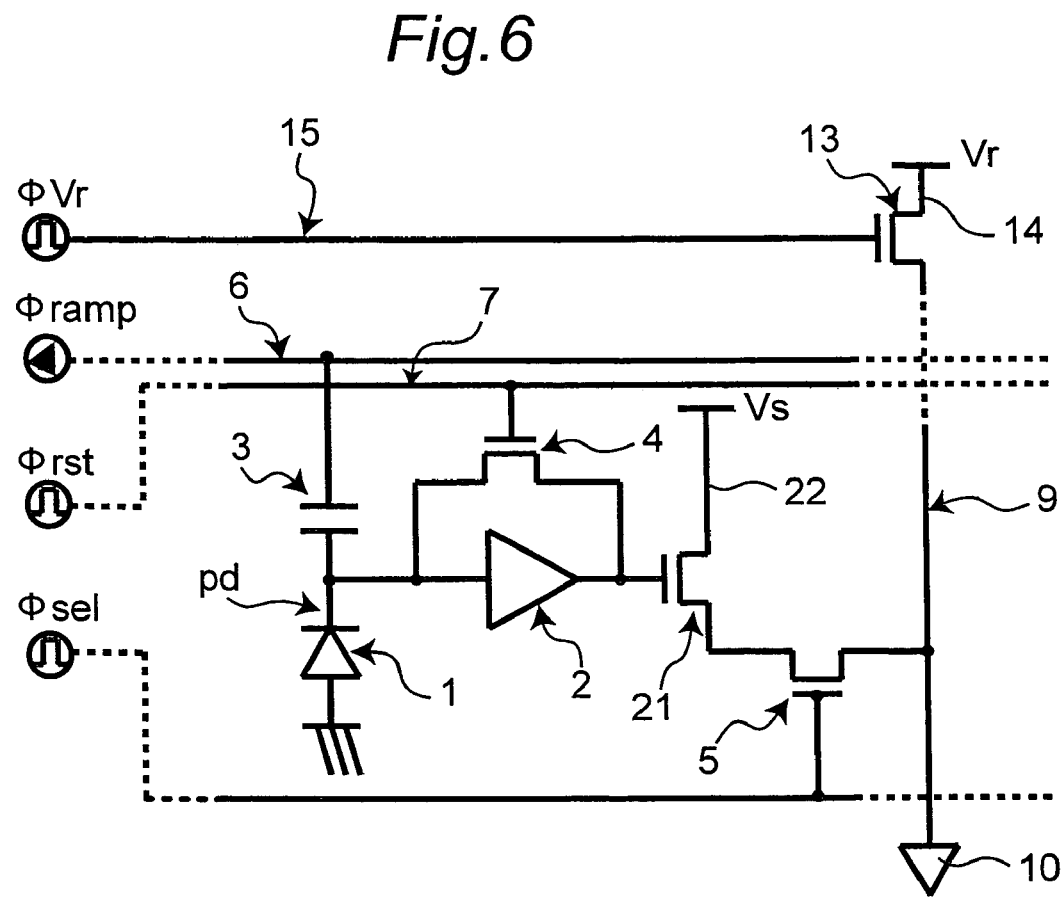

Fig.7 BACKGROUND ART
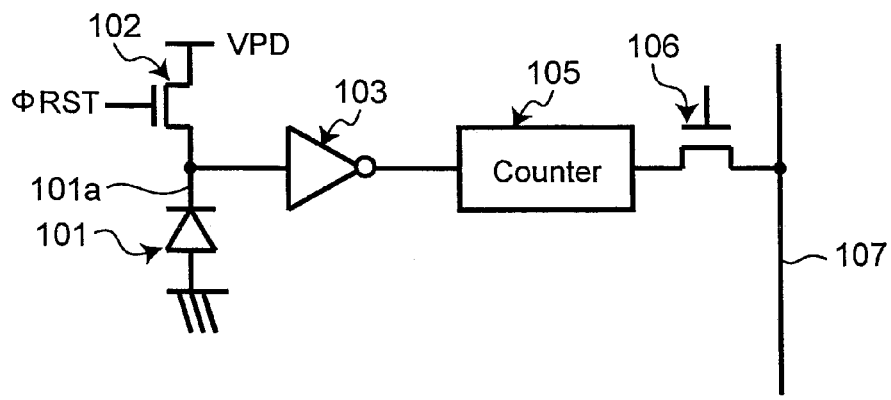
Fig.8A
BACKGROUND ART
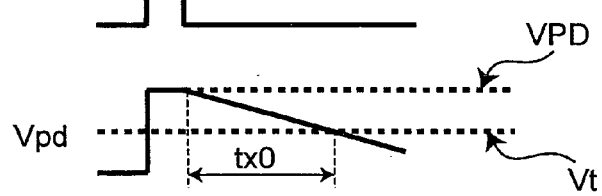
Fig.8B
BACKGROUND ART
Fig.8C
BACKGROUND ART

SOLID-STATE IMAGE PICKUP DEVICE AND SIGNAL READING METHOD THEREFOR This nonprovisional application claims priority under 35 U.S.C. §119(a) on Patent Application No. 2004-003915 filed in Japan on Jan. 9, 2004, the entire contents of which are hereby incorporated by reference.

BACKGROUND OF THE INVENTION

The present invention relates to a solid-state image pickup device such as, for example, a solid-state image pickup device that can realize low voltage operation and low power consumption, and a signal reading method therefor.

Conventionally, pulse-width modulation solid-state image pickup devices (e.g., see JP 58-179068 A) have been known as a solid-state image pickup device which outputs a signal corresponding to incident light as a pulse width signal.

An example of conventional pulse-width modulation solid-state image pickup devices is shown in FIG. 7. The pulse-width modulation solid-state image pickup device has unit cells, i.e. pixels, each composed of a photodiode 101, a reset transistor 102 for resetting the photodiode 101, and a comparator 103 for detecting a threshold value. An input terminal of the comparator 103 is connected to a cathode terminal 101a of the photodiode 101. An output terminal of the comparator 103 is connected to a counter circuit 105, and the counter circuit 105 is connected to a vertical signal line 107 via a vertical select transistor 106.

As the photodiode 101 performs photoelectric conversion of incident light, an output voltage Vpd outputted to the cathode terminal 101a varies as shown in a timing chart of FIG. 8. When the output voltage Vpd reaches a specified reference voltage Vt, an output signal Vout-op of the comparator 103 is inverted.

In this solid-state image pickup device, when a reset signal ΦRST is set to H level, the reset transistor 102 turns ON, causing the output voltage Vpd of the photodiode 101 to be reset to a reset voltage VPD. Next, by the reset signal ΦRST being set to L level, the photodiode 101 starts to store signal charges. Since the photodiode 101 generates signal charges by photoelectric conversion, the voltage of the cathode terminal 101a of the photodiode 101 lowers in response to the quantity of incident light. Then, at a time point when the electric potential (output voltage Vpd) of the input terminal of the comparator 103 reaches a reference voltage Vt, the output signal Vout-op of the comparator 103 changes from H to L level.

A time duration tx0 from when the photodiode 101 starts to store the signal charges until when the output voltage Vpd reaches the reference voltage Vt corresponds to the quantity of signal charges that the photodiode 101 has generated by photoelectric conversion.

During a period in which the output signal Vout-op of the comparator 103 is kept at H level, the counter circuit 105 performs a counting operation. By this counting operation, the counter circuit 105 performs analog-to-digital conversion within the pixel, and outputs in a read period a digital value resulting from the analog-to-digital conversion.

The counter circuit 105, when provided within a pixel as in this solid-state image pickup device, would cause the circuit scale of the pixel to be increased. Also, the time tx0 that it takes for the voltage (output voltage Vpd) of the cathode terminal 101a of the photodiode 101 to change from the specified reset voltage VPD to the reference voltage Vt of the comparator 103 within the pixel depends on the intensity of incident light.

Therefore, in a very dark state, for example, the time duration tx0 from the point of starting to store signal charges to the point of the output voltage Vpd reaching the reference voltage Vt becomes longer. This causes a long time to be taken for obtainment of a pulse signal given by the output signal Vout-op. As a result, it has been impossible to make a setting such that the pulse signal is generated during a given period.

SUMMARY OF THE INVENTION

Accordingly, an object of the present invention is to provide a solid-state image pickup device which allows the circuit scale of the pixel to be reduced and which is capable of obtaining an output signal in a desired period.

In order to accomplish the above object, a solid-state image pickup device according to the present invention includes:

one or more pixels, said or each pixel comprising:
- a photoelectric conversion part performing photoelectric conversion on incident light;
- a comparison part connected to an output terminal of the photoelectric conversion part to compare an output voltage of the photoelectric conversion part with a specified reference voltage and produce an output signal representing a result of the comparison;
- a reset part connected to the output terminal of the photoelectric conversion part to discharge a signal charge generated by the photoelectric conversion part;
- a capacitive element having two ends, one of which is connected to the output terminal of the photoelectric conversion part; and
- a control line connected to the other end of the capacitive element; and a control voltage application part applying a first control voltage to the control line during a signal storage period so as to make an electric potential at the output terminal of the photoelectric conversion part fall outside a transition region of the comparator, and applying a second control voltage to the control line during a signal read period so as to make the electric potential at the output terminal of the photoelectric conversion part fall within the transition region of the comparator.

In the solid-state image pickup device of the present invention, after signal charges generated by the photoelectric conversion part are discharged by the reset part, a signal storage period starts and the photoelectric conversion part performs photoelectric conversion of incident light to generate and store signal charges.

In this signal storage period, the control voltage application part applies the first control voltage to the control line so that the electric potential at the output terminal of the photoelectric conversion part departs from the transition region of the comparator. In a signal read period succeeding the signal charge storage period, the control voltage application part applies the second control voltage to the control line so that the electric potential at the output terminal of the photoelectric conversion part falls within the transition region of the comparison part.

According to this invention, by the setting of the first and second control voltages of the control voltage application part, an output signal of the comparator can be obtained in a desired period and a dynamic range of the photoelectric conversion part can be ensured, without depending on the transition region of the comparator. Moreover, it becomes possible to set a resolution of the photoelectric conversion part.

Further, according to the invention, circuit scale of the pixel can be reduced, compared with conventional devices having counter circuits for individual pixels, or unit cells.

In one embodiment, the capacitive element comprises a MOSFET.

In this embodiment, since the capacitive element is implemented by a MOSFET that is usable for even other switching element, the structure of the device as a whole can be simplified.

In one embodiment, an electrode(s) of the capacitive element is(are) made of polysilicon.

In this embodiment, since the electrode(s) of the capacitive element is(are) made of polysilicon, which is widely used as gate electrode material for MOS transistors or wiring material, the fabrication is facilitated.

In one embodiment, the electrode(s) of the capacitive element is(are) made of metal. Thus, electrical resistance is reduced.

In one embodiment, the comparison part comprises an inverter circuit.

In this embodiment, since it becomes possible to make up the comparison part from two MOS transistors, the number of transistors can be reduced.

In one embodiment, the pixels each have a row select switch which is connected to an output side of the associated comparison part, and the pixels are arrayed in a matrix form, the solid-state image pickup device further comprises a vertical scanner circuit selecting the pixels on a row-by-row basis, and the control line is a horizontal control line connected in common with a plurality of pixels of an identical row.

In this embodiment, a plurality of pixels are selected on a row-by-row basis by the vertical scanner circuit, and the potential of the horizontal control line is controlled also on a row-by-row basis by the control voltage application part. Further, functions necessary for A/D conversion of the output voltage of the photoelectric conversion part can be shared between the comparison part included in the pixel and the associated column comparator provided outside the pixel. Column comparators are provided for each of the columns of pixels. The above arrangement is, therefore, effective for downsizing of each pixel.

In one embodiment, the solid-state image pickup device further includes a recording part for recording a time at which the output signal of the comparison part is inverted during the signal read period.

In this embodiment, the time of inversion of the output signal recorded by the recording part is made proportional to the quantity of light incident on the photoelectric conversion part during the signal storage period. That is, the recording part records an output voltage of the photoelectric conversion part in the form of a time of signal inversion. Accordingly, a signal representing a quantity of incident light can be transferred in the form of a signal representing the time, so that lower-voltage operation becomes practicable as compared with the case in which the signal representing the quantity of incident light is transferred in the form of a voltage signal.

In one embodiment, the recording part comprises a counter circuit and a latch circuit.

In this embodiment, the recording part indicates the time of inversion with a count value of the counter circuit, and the count value is stored in the latch circuit.

In one embodiment, the pixels are arrayed in a matrix form, and recording parts are provided for each of columns of the pixels.

In this embodiment, by virtue of the provision of the recording parts for each column of the pixels, functions necessary for A/D conversion of an output voltage of the photoelectric conversion part can be shared between the comparison parts included in the pixels and the associated column comparators provided outside the pixels. This arrangement is effective in downsizing the pixels.

In one embodiment, the reset part consists of a reset switch connected between an input terminal and an output terminal of the comparison part, the reset switch being turned ON to make the input terminal and the output terminal short-circuited so that an electric potential of the photoelectric conversion part is reset to a specified reset potential.

In this embodiment, the reset switch has both a function of performing offset compensation of the comparator and a resetting function of resetting the potential at the output terminal of the photoelectric conversion part.

In one embodiment, the reset switch is constituted of a MOSFET.

In this embodiment, the structure of the solid-state image pickup device is simplified.

In one embodiment, the solid-state image pickup device further includes a buffer part connected to an output terminal of the comparison part to receive the output signal of the comparison part and output a binary signal according to the received output signal.

In this embodiment, an output signal of the comparator is inputted to the buffer part, and the buffer part outputs a binary signal in response to the output signal. With the placement of the buffer part, the need for directly driving a parasitic capacitance accompanying a vertical signal line connected to the pixels can be eliminated.

In one embodiment, the control voltage application part controls amplitude and a rate of change with time of the second control voltage to be applied to the control line.

In this embodiment, the resolution of the solid-state image pickup device can be controlled by the control voltage application part controlling the rate of change of the second control voltage with respect to time, and the dynamic range of the solid-state image pickup device can be controlled by the control voltage application part controlling the amplitude of the second control voltage.

In one embodiment, the control voltage application part controls amplitude of the first control voltage and amplitude of the second control voltage in such a manner that a voltage for driving the photoelectric conversion part is limited. Therefore, the operating region of the photoelectric conversion part is controlled by the control voltage application part.

A signal reading method according to another aspect of the present invention is a signal reading method for a solid-state image pickup device having a photoelectric conversion part performing photoelectric conversion on incident light, a comparison part connected to an output terminal of the photoelectric conversion part to compare an output voltage of the photoelectric conversion part with a specified reference voltage and produce an output signal representing a result of the comparison, a capacitive element one end of which is connected to the output terminal of the photoelectric conversion part, and a control line connected to the other end of the capacitive element. The reading method includes applying a first control voltage to the control line so as to make an electric potential at the output terminal of the photoelectric conversion part fall outside a transition region of the comparator during a signal storage period, and applying a second control voltage to the control line so as to make the electric potential at the output terminal of the photoelectric conversion part fall within the transition region of the comparator during a signal read period following the signal storage period.

In this signal reading method, appropriate setting of the first and second control voltages makes it possible to ensure the dynamic range of the photoelectric conversion part and to set a resolution of the photoelectric conversion part, without depending on the transition region of the comparator.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein:

FIG. 5A is a circuit diagram showing Configuration Example 1 of a comparator 2 of the first embodiment;

FIG. 5B is a circuit diagram showing Configuration Example 2 of the comparator 2;

FIG. 6 is a diagram showing the configuration of a pixel in a second embodiment of the present invention;

FIG. 7 is a diagram showing the configuration of a pulse-width modulation solid-state image pickup device according to background art; and FIGS. 8A, 8B and 8C are timing charts for explaining operation of the background art pulse-width modulation solid-state image pickup device.

DETAILED DESCRIPTION OF THE INVENTION

Hereinbelow, the present invention is described in detail by way of embodiments thereof illustrated in the accompanying drawings.

FIRST EMBODIMENT

Figure 1:
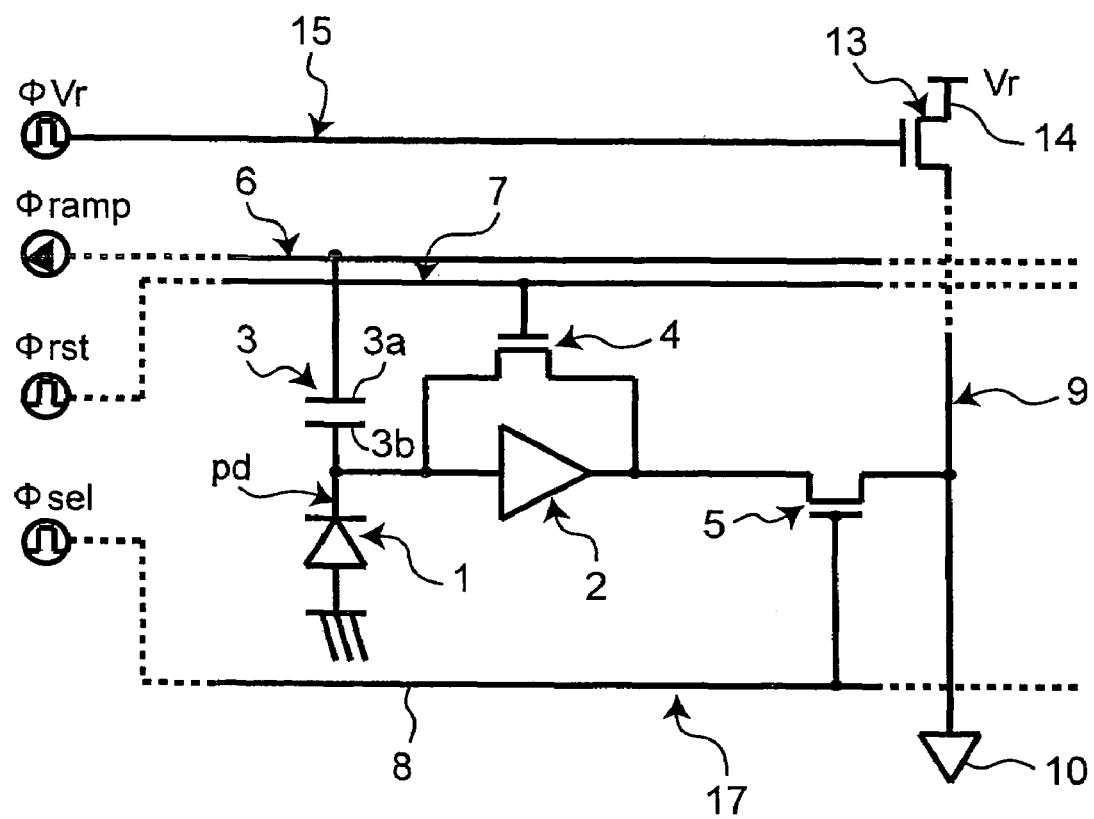
FIG. 1 is a diagram showing the configuration of one pixel in a first embodiment of the solid-state image pickup device of the present invention.

FIG. 1 shows the configuration of a first embodiment of the solid-state image pickup device of the present invention. In FIG. 1, of n-row and m-column pixels, only one pixel 17 is shown for simplicity's sake.

The pixel 17 has a photodiode 1 as a photoelectric conversion part, a capacitor 3 as a capacitive element, a comparator 2 as a comparison part, and a reset switch 4 as a reset part.

A node pd as an output terminal connected to a cathode electrode of the photodiode 1 is connected to one end of the capacitor 3. The node pd is connected to an input terminal of the comparator 2. The other end of the capacitor 3 is connected to a horizontal control line 6 as a control line. The horizontal control line 6 is connected to a variable voltage generator circuit 71 (see FIG. 4) as a control voltage application part which will be described later.

An output terminal of the comparator 2 is connected to a drain of a vertical select transistor 5 serving as a row select switch. The reset switch 4 is connected to an input terminal and an output terminal of the comparator 2. The reset switch 4 is formed of a MOS transistor, and a gate of the MOS transistor is connected to a reset select line 7.

The reset switch 4 has both a function of performing offset compensation of the comparator 2 and a function of resetting the voltage of the photodiode 1.

A source of the vertical select transistor 5 is connected to a vertical signal line 9, and a gate of the vertical select transistor 5 is connected to a row select signal line 8. One end of the vertical signal line 9 is connected to a drain of a vertical-signal-line reset transistor 13, and the other end of the vertical signal line 9 is connected to an input terminal of a column comparator 10.

A gate of the vertical-signal-line reset transistor 13 is connected to a vertical-signal-line reset control line 15, and a source of the vertical-signal-line reset transistor 13 is connected to a vertical-signal-line reset voltage line 14.

Figure 4:
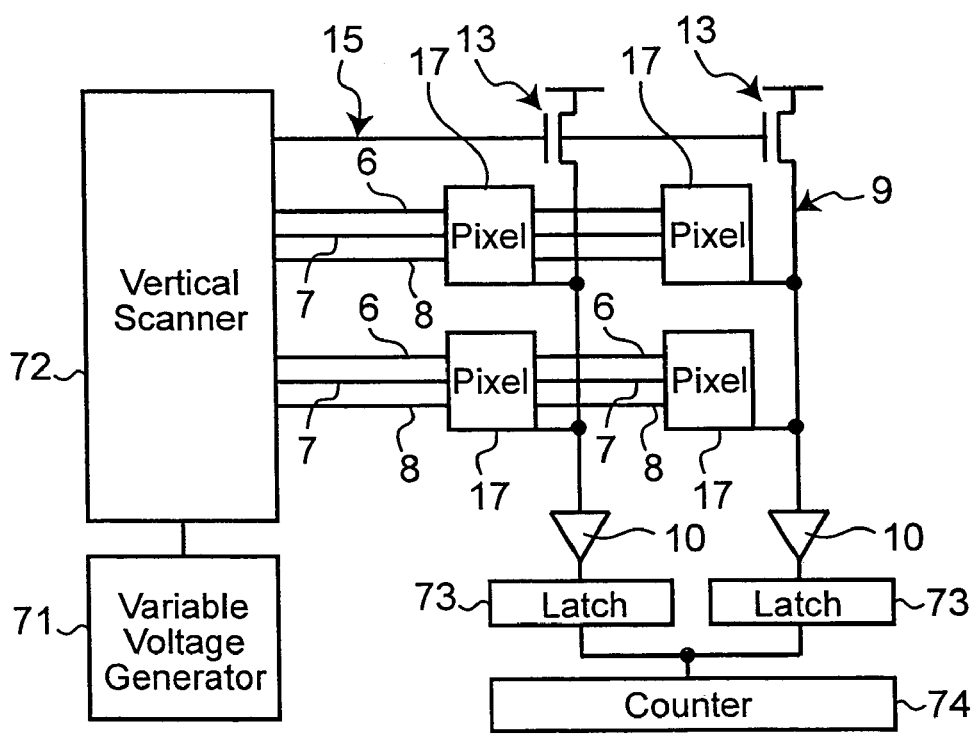
FIG. 4 is a diagram showing a state in which pixels according to the first embodiment are arrayed in a matrix shape.

FIG. 4 depicts a 2-row, 2-column portion out of the pixels 17, or unit cells, arrayed in an n-row, m-column matrix in the first embodiment. The horizontal control line 6 is connected in common to pixels 17 of one identical row. Likewise, the reset select line 7 and the row select signal line 8 are connected in common to pixels 17 of one identical row. The horizontal control line 6, the reset select line 7 and the row select signal line 8 are connected to a vertical scanner circuit 72 which selects pixels 17 on a row-by-row basis. The variable voltage generator circuit 71 is also connected to the vertical scanner circuit 72. A latch circuit 73 is connected to an output side of each column comparator 10, and the latch circuits 73 are connected to one counter circuit 74. The latch circuits 73 and the counter circuit 74 constitute a recording part.

Configuration Example 1 of the comparator 2 is shown in FIG. 5A. In Configuration Example 1, the comparator 2 is made up of two MOS transistors: an NMOS transistor 81 and a PMOS transistor 82. Specifically, a gate of the NMOS transistor 81 and a gate of the PMOS transistor 82 are connected to an input terminal 80, and a junction point between a drain of the NMOS transistor 81 and a source of the PMOS transistor 82 is connected to an output terminal 83.

FIG. 5B shows Configuration Example 2 of the comparator 2. In Configuration Example 2, a gate of a PMOS transistor 86 is connected to a bias-voltage terminal 89 by a signal line 87. A gate of an NMOS transistor 85 is connected to an input terminal 84. A junction point between a drain of the NMOS transistor 85 and a source of the PMOS transistor 86 is connected to an output terminal 88.

Configuration Example 2 is a source-grounded inverter circuit. Though indeed having a need for additionally providing a signal line 87 for bias voltage within the circuit as compared with Configuration Example 1 of FIG. 5A, the power consumed by this inverter circuit of Configuration Example 2 is controllable through control of the bias-voltage signal line 87. In Configuration Example 2 of FIG. 5B, the inverter circuit is composed of two transistors which are the NMOS transistor 85 and the PMOS transistor 86, though the inverter circuit may be formed of NMOS transistors only or PMOS transistors only.

Figure 2:
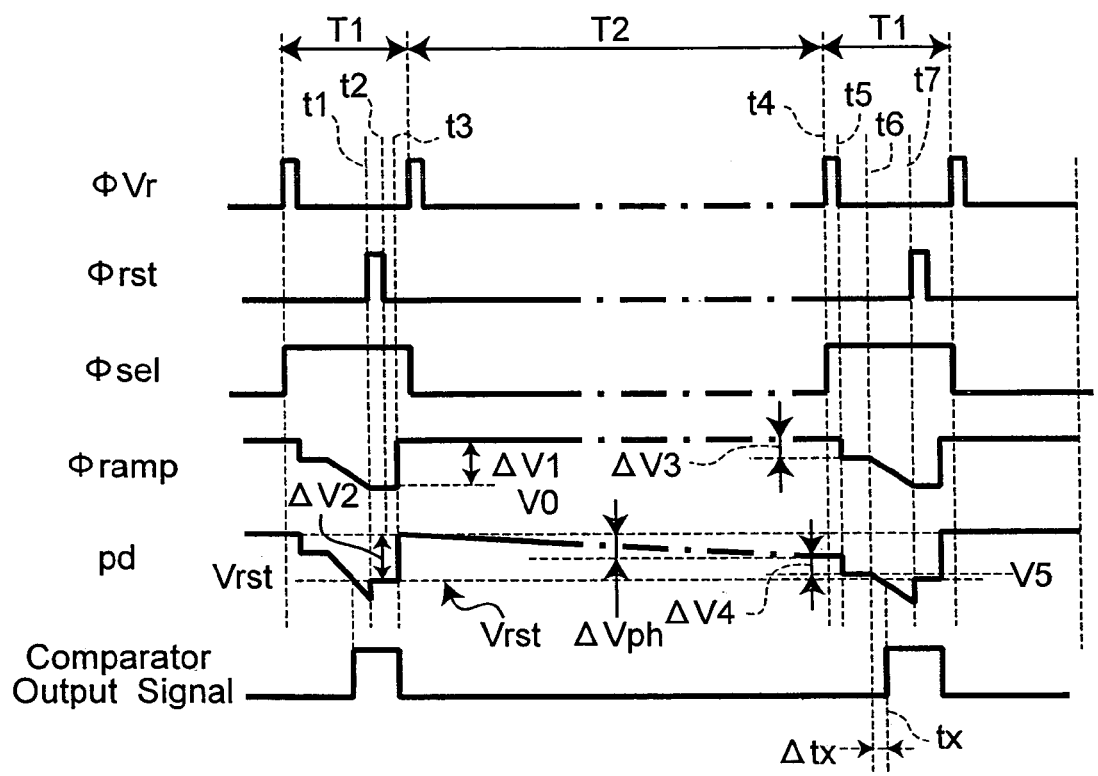
FIG. 2 is a timing chart for explaining the operation of the first embodiment.

Next, operation of this first embodiment will be explained with reference to a timing chart shown in FIG. 2. Referring to FIG. 2, T1 denotes a signal read period and T2 denotes a signal storage period. It is to be noted that in FIG. 2, times or points are represented by t1, t2, ... in lowercase letters, and periods (duration) are represented by T1, T2 in uppercase letters.

First, at time t1, the reset signal $\Phi$rst rises for every photodiode 1 in the nth row, causing the reset switch 4 of the comparator 2 to be turned ON. As a result, the electric potential of the node pd of the photodiode 1 is reset.

Figure 3:
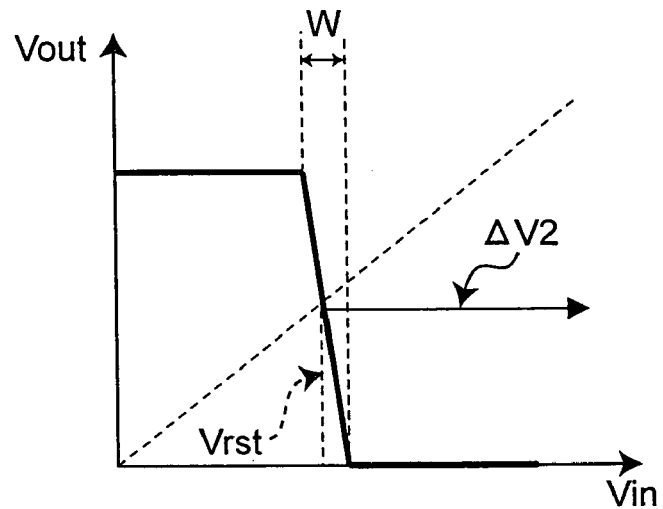
FIG. 3 is a graph showing a relationship between input voltage and output voltage of the comparator.

FIG. 3 shows a relationship between input voltage Vin and output voltage Vout of the comparator 2. By the reset switch 4 being turned ON, the input terminal and output terminal of the comparator 2 become equal in electric potential to each other. Therefore, the electric potential of the cathode electrode (node pd) of the photodiode 1 is reset to a reset potential Vrst in a transition state W of the comparator 2.

In a read operation of the solid-state image pickup device, as will be described later, variation components of the electric potential of the node pd that varies from the reset potential Vrst obtained by short-circuiting the input terminal and the output terminal of the in-pixel comparator 2 are treated as a signal. Therefore, even if the value of the reset potential Vrst itself varies from pixel to pixel due to manufacturing factors or the like, there is no obstacle to the read operation.

Next, at time t2, the resetting of the electric potential at the node pd of the photodiode 1 is ended. At time t3, a potential $\Phi$ramp of the horizontal control line 6 is increased from V0 by a voltage $\Delta$V1. This potential $\Phi$ramp is given from the variable voltage generator circuit 71 to the horizontal control line 6. The voltage $\Delta$V1 is a first control voltage.

Because of the node pd being in a floating state, given a capacitance Cpd of the photodiode 1 and a capacitance Ccnt of the capacitor 3 placed between the photodiode 1 and the horizontal control line 6, then the electric potential of the node pd of the photodiode 1 increases by a voltage $\Delta$V2 that is calculated by the following equation:

$$\Delta V2 = \Delta V1 \times Ccnt/(Ccnt+Cpd) \quad (1)$$

In this case, setting the voltage $\Delta$V1 to a sufficiently large value allows the electric potential of the node pd of the photodiode 1 to be shifted to a level which is sufficiently far from the transition state W of the comparator 2 shown in FIG. 3.

The variable voltage generator circuit 71 applies the potential $\Phi$ramp to the horizontal control line 6, by which the electric potential of the node pd is made to depart from the transition region W of the comparator 2 via the capacitor 3. From this state, an optical signal storage state for the nth row starts.

In signal storage period T2, electrons are generated from photons through photoelectric conversion in the photodiode 1, so that the electric potential of the node pd goes lower from a combined voltage of (reset potential Vrst+voltage $\Delta$V2) proportionally to the quantity of incident light.

Although this first embodiment is described on a case where electrons are stored through photoelectric conversion, yet an arrangement may be adopted in which holes are stored through photoelectric conversion. In the case where holes are stored, the electric potential of the node pd increases proportionally to the quantity of incident light.

Next, time t4 is a time when the nth row of the succeeding frame starts to be read. As a vertical-signal-line reset signal $\Phi$Vr goes H level, the vertical-signal-line reset transistor 13 turns ON, so that the vertical signal line 9 is reset to a vertical-signal reset voltage Vr. Also, as a row select pulse $\Phi$sel goes H level, the vertical select transistor 5 turns ON, so that the output terminal of the nth in-pixel comparator 2 and the vertical signal line 9 become conducting.

Next, at time t5, the variable voltage generator circuit 71 lowers the potential $\Phi$ramp of the horizontal control line 6 by a voltage $\Delta$V3, by which the electric potential of the node pd of the photodiode 1 that has been increased after the resetting for the preceding frame decreases by a voltage $\Delta$V4 that is calculated by Equation (2) below:

$$\Delta V4 = \Delta V3 \times Ccnt/(Ccnt+Cpd) \quad (2)$$

Given that the electric potential of the node pd of the photodiode 1 is decreased by $\Delta$Vph at the optical signal storage time, then the electric potential of the node pd of the photodiode 1, at time t5, becomes a potential V5 calculated by Equation (3) below:

$$V5 = Vrst + \Delta V2 - \Delta Vph - \Delta V4 \quad (3)$$

In response to the brightness of incident light, the variable voltage generator circuit 71 can set the value of the voltage $\Delta$V3 to any arbitrary one. For example, the value of the voltage $\Delta$V3 may be controlled from a digital signal processing circuit (DSP) placed et at the succeeding stage of this solid-state image pickup device. When the potential $\Phi$ramp of the horizontal control line 6 is lowered by the voltage $\Delta$V3 at a pixel signal reading start (t4), the electric potential of the node pd can be determined by Equations (2) and (3), as described before:

$$V5 = Vrst + \Delta V2 - \Delta Vph - \Delta V4 \quad (3)$$

$$\Delta V4 = \Delta V3 \times Ccnt/(Ccnt+Cpd) \quad (2)$$

For example, when the quantity of incident light is large, i.e., when the voltage $\Delta$Vph is large, the potential V5 of the node pd of the photodiode 1 may become lower than voltages in the transition region W of the comparator 2 due to the voltage $\Delta$V4. Therefore, in such a case, the voltage $\Delta$V3 may be set to 0.

Next, at time t6, the variable voltage generator circuit 71 makes the potential $\Phi$ramp of the horizontal control line 6 varied (lowered) from the voltage of time t5 succeeding the signal reading start time t4. Given that the amplitude voltage of a ramp wave of the potential $\Phi$ramp is $\Delta$Vramp, the following Equation (4) holds:

$$\Delta V2 = \Delta Vph + \Delta V4 + \Delta Vramp \quad (4)$$

Assuming a state in which incident light is zero by neglecting any effects of voltage drops due to dark currents of the photodiode 1 for simplicity's sake, the voltage $\Delta$Vph=0. In this case, given a period Htime during which the ramp wave of the potential $\Phi$ramp is held operative, then $$\Delta V2 = \Delta V4 + \Delta Vramp = \Delta V4 + Sr \cdot Htime \quad (5)$$

where Sr in Equation (5) is the rate of voltage change with time of the ramp wave.

Assuming that the output signal is inverted after an elapse of time $\Delta$tx after the ramp wave operated, then the following Equations (6) and (7) hold:

$$\Delta V2 = \Delta V4 + \Delta Vph + Sr \cdot \Delta tx \quad (6)$$

$$\Delta tx = (\Delta V2 - \Delta V4 - \Delta Vph)/Sr \quad (7)$$

Resolution R of this solid-state image pickup device is given by the following Equation (8):

$$R = d(\Delta tx)/d(\Delta Vph) \quad (8)$$

Accordingly, the following holds.

$$R = -1/Sr \quad (9)$$

Consequently, the resolution R can be enhanced by decreasing the gradient of the ramp wave of the potential Φramp given to the horizontal control line 6.

Also, dynamic range Dy for the quantity of incident light is given by the following Equation (10):

$$Dy = \Delta V2 - \Delta V4 \quad (10)$$

Referring to Equation (10), the dynamic range Dy for the quantity of incident light becomes a maximum with $\Delta V4=0$. However, the rate of voltage change with time Sr also becomes a maximum value $Sr_{MAX}$, which causes the resolution R to deteriorate. The dynamic range Dy and the resolution R can be arbitrarily set by arbitrarily setting the rate of voltage change with time Sr and the value of the voltage $\Delta V4$.

As shown above, at time t6, the potential Φramp of the horizontal control line 6 starts to be lowered by the ramp wave lowering from a potential of (V0+ΔV1−ΔV3), and reaches a potential V0 in a period lasting to time t7. As the potential Φramp of the horizontal control line 6 lowers, the electric potential of the node pd of the photodiode 1 also lowers from V5 via the capacitor 3.

Over a time duration from time t5 to time t7 of the signal read period T1, the voltage Φramp that the variable voltage generator circuit 71 applies to the horizontal control line 6 serves as a second control voltage.

Once the electric potential of the node pd has reached the reference voltage (threshold voltage) of the comparator 2, the output signal of the comparator 2 is inverted. That is, at time tx between time t6 and time t7, the electric potential of the node pd of the photodiode 1 reaches the threshold voltage Vrst of the comparator 2, so that the output signal of the comparator 2 is inverted from L level to H level.

As shown in FIG. 2, the output signal of the comparator 2 inverted from L level to H level at time tx is transferred via the vertical select transistor 5 to the column comparator 10 connected to the terminal of the vertical signal line 9.

The counter circuit 74 connected to the output side of the column comparator 10 starts to operate at the row reading start time t6. Whereas the vertical signal line 9 has been reset to the vertical-signal reset voltage Vr by the row reading start time t4, the vertical signal line 9 receives, at time tx, from an nth-row and mth-column pixel 17 an output signal that changes from L level to H level. The output signal is inputted to the associated latch circuit 73 via the column comparator 10, and then inputted from the latch circuit 73 to the counter circuit 74. The latch circuit 73 and the counter circuit 74 constitute a recording part.

The larger the quantity of incident light on the photodiode 1, the larger the quantity of voltage drop ΔVph at the node pd. Therefore, from Equation (7), the larger the quantity of incident light, the shorter the time Δtx taken for the potential of the node pd to reach the reset potential Vrst by the ramp wave of the potential Φramp of the horizontal control line 6 during the signal read period T1. Thus, by the counter circuit 74 decrementing a count from the time t4, a count value stored in the recording part comprised of the latch circuit 73 and the counter circuit 74 on the output side of the column comparator 10 can be made proportional to the quantity of incident light at time tx. That is, the count value stored in the recording part can be obtained as a digital signal corresponding to the quantity of incident light.

Instead of the counter circuit 74, a ramp ADC (Analog-to-Digital Conversion) circuit may be connected to the output side of the column comparator 10, so that the ramp ADC circuit performs A/D conversion of the H-level signal inputted from the comparator 2 to the column comparator 10 at time tx.

A/D conversion generally involves ten odd transistors. In contrast, according to the scheme of the solid-state image pickup device of this first embodiment, the pixel 17 has only a reset MOS transistor serving as the reset switch 4, a MOS transistor serving as the vertical select transistor 5, and two MOS transistors constituting the comparator 2, as described above, hence four transistors in total. That is, the pixel 17 performs part of the A/D conversion function with the four transistors. Then, the rest of the A/D conversion function is fulfilled by a signal processing part provided for each column in succession to the column comparator 10 (i.e., the latch circuits 73 and the counter circuit 74 serving as the recording part). Thus, according to this first embodiment, it becomes feasible to downsize the pixel 17 comprised of four transistors only.

Also according to this first embodiment, since the pixel 17 transfers an output signal derived from binarization of stored signals by time through the comparator 2, it can be expected that the pixel 17 operates on lower voltages, as compared with image sensors which transfer output signals by voltage. Further, in the signal reading scheme adopted by this embodiment, by the aid of the potential Φramp given to the horizontal control line 6, the electric potential at the node pd of the photodiode 1 is put outside of the operation region W of the comparator 2 in the signal storage period T2, and the electric potential at the node pd of the photodiode 1 is returned to the operation region W of the comparator 2 in the signal read period t1. Accordingly, use of a circuit boosted from the supply voltage as the power supply for the variable voltage generation circuit 71, which is a control voltage application part, makes it possible to ensure the dynamic range of the photodiode 1 even against fall of the supply voltage, independently of the operating range (supply voltage) of the comparator 2.

Also, the potential Φramp of the horizontal control line 6 is controlled on the row basis, and moreover part of functions necessary for A/D conversion is shared by the comparator 2 (e.g., an inverter circuit composed of two transistors) provided in the pixel 17 while the rest of the functions necessary for A/D conversion are assigned to the column comparator 10 side provided for each column. Thus, by the sharing of the A/D conversion functions, it becomes feasible to downsize the pixel 17.

Further, in the reading method adopted by the solid-state image pickup device of this first embodiment, the potential Φramp given to the horizontal control line 6 is raised in the signal storage period T2 so that the potential at the node pd of the photodiode 1 is shifted from the working point of the comparator 2, while the potential at the node pd is lowered by the ramp wave of the potential Φramp back to the working point of the comparator 2 in the signal read period T1. The same effects can be obtained also when the potential Φramp of the horizontal control line 6 is lowered in the signal storage period T1 so as to be shifted from the working point of the comparator 2 while the potential of the node pd of the photodiode 1 is raised by using the ramp wave of the potential Φramp in the signal read period T1 so as to be brought to the working point of the comparator 2.

SECOND EMBODIMENT

Next, the configuration of a second embodiment of the solid-state image pickup device of the present invention is shown in FIG. 6. The second embodiment differs from the first embodiment in that a buffer MOS transistor 21 is connected as a buffer part between the output side of the comparator 2 and the vertical select transistor 5. Therefore, in FIG. 6, parts of the same constitution as in the first embodiment are designated by the same reference numerals as in the first embodiment. This second embodiment will be explained by principally focusing on the differences from the first embodiment.

In this second embodiment, the output terminal of the comparator 2 is connected to a gate of the buffer MOS transistor 21, and a pixel output voltage line 22 is connected to a drain of the buffer MOS transistor 21.

A source of the buffer MOS transistor 21 is connected to a drain of the vertical select transistor 5, and a gate of the vertical select transistor 5 is connected to the vertical select line 8. A source of the vertical select transistor 5 is connected to the vertical signal line 9. One end of the vertical signal line 9 is connected to a drain of the vertical-signal-line reset transistor 13, and the other end of the vertical signal line 9 is connected to an input terminal of the column comparator 10. A gate of the vertical-signal-line reset transistor 13 is connected to the vertical-signal-line reset control line 15, and a source of the vertical-signal-line reset transistor 13 is connected to the vertical-signal-line reset voltage line 14.

In the first embodiment, during the read period T1, the output of the comparator 2 is connected to the vertical signal line 9 via the vertical select transistor 5 of an ON state. For instance, in a solid-state image pickup device of about 300,000 pixels (640×480), since the vertical signal line 9 is accompanied by a parasitic capacitance of a few pF or so, it is necessary, with the constitution of the first embodiment, for the comparator 2 to drive the load capacitance of a few pF accompanying the vertical signal line 9 during the read period T1.

In contrast to this, in the second embodiment, by the provision of the buffer-use transistor 21 at the output terminal of the comparator 2, the need for the comparator 2 to drive the parasitic capacitance accompanying the vertical signal line 9 can be eliminated.

In this second embodiment, the buffer-use transistor 21 performs a function of making the output voltage line 22 conduct to the vertical signal line 9, to which a signal voltage Vs is applied, when an output signal of the comparator 2 is inverted from L level to H level at time tx shown in FIG. 2.

In this second embodiment, the vertical reset signal voltage Vr is inputted to the column comparator 10 connected to an end of the vertical signal line 9 until time tx. At time x when the output of the comparator 2 is inverted from L level to H level, the buffer transistor 21 is turned ON, so that the vertical signal line 9 is connected to the output voltage line 22, and a signal voltage Vs is inputted to the column comparator 10.

Upon input of the signal voltage Vs into the column comparator 10, a count value of the counter circuit 74, which started a counting operation at time t4 in the read period T1, is latched by the latch circuit 73. Then, during the storage period T2, a signal proportional to the signal charges stored at the node pd is digitized. By designing the column comparators 10 so that the difference between the signal voltage Vs and the vertical reset signal voltage Vr is small, power consumption necessary for charging and discharging the vertical signal line 9 can be reduced.

In the above first and second embodiments, the capacitor 3 as a capacitive element may be formed of a MOSFET.

Also, the electrodes 3a, 3a of the capacitor 3 may be formed of either polysilicon or metal.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A solid-state image pickup device, comprising:
one or more pixels, said or each pixel comprising:
a photoelectric conversion part performing photoelectric conversion on incident light;
a comparison part connected to an output terminal of the photoelectric conversion part to compare an output voltage of the photoelectric conversion part with a specified reference voltage and produce an output signal representing a result of the comparison;
a reset part connected to the output terminal of the photoelectric conversion part to discharge a signal charge generated by the photoelectric conversion part;
a capacitive element having two ends, one of which is connected to the output terminal of the photoelectric conversion part; and
a control line connected to the other end of the capacitive element; and
a control voltage application part applying a first control voltage to the control line during a signal storage period so as to make an electric potential at the output terminal of the photoelectric conversion part fall outside a transition region of the comparator, and applying a second control voltage to the control line during a signal read period so as to make the electric potential at the output terminal of the photoelectric conversion part fall within the transition region of the comparator.

2. The solid-state image pickup device as claimed in claim 1, wherein the capacitive element comprises a MOSFET.

3. The solid-state image pickup device as claimed in claim 1, wherein an electrode of the capacitive element is made of polysilicon.

4. The solid-state image pickup device as claimed in claim 1, wherein an electrode of the capacitive element is made of metal.

5. The solid-state image pickup device as claimed in claim 1, wherein the comparison part comprises an inverter circuit.

6. The solid-state image pickup device as claimed in claim 1, wherein the pixels each have a row select switch which is connected to an output side of the associated comparison part, and the pixels are arrayed in a matrix form;
the solid-state image pickup device further comprises a vertical scanner circuit selecting the pixels on a row-by-row basis; and
the control line is a horizontal control line connected in common with a plurality of pixels of an identical row.

7. The solid-state image pickup device as claimed in claim 1, further comprising a recording part for recording a time at which the output signal of the comparison part is inverted during the signal read period.

8. The solid-state image pickup device as claimed in claim 7, wherein the recording part comprises a counter circuit and a latch circuit.

9. The solid-state image pickup device as claimed in claim 7, wherein the pixels are arrayed in a matrix form, and recording parts are provided for each of columns of the pixels.

10. The solid-state image pickup device as claimed in claim 1, wherein the reset part consists of a reset switch connected between an input terminal and an output terminal of the comparison part, the reset switch being turned ON to make the input terminal and the output terminal short-circuited so that an electric potential of the photoelectric conversion part is reset to a specified reset potential.

11. The solid-state image pickup device as claimed in claim 10, wherein the reset switch comprises a MOSFET.

12. The solid-state image pickup device as claimed in claim 1, further comprising a buffer part connected to an output terminal of the comparison part to receive the output signal of the comparison part and output a binary signal according to the received output signal.

13. The solid-state image pickup device as claimed in claim 1, wherein the control voltage application part controls amplitude and a rate of change with time of the second control voltage to be applied to the control line.

14. The solid-state image pickup device as claimed in claim 1, wherein
the control voltage application part controls amplitude of the first control voltage and amplitude of the second control voltage in such a manner that a voltage for driving the photoelectric conversion part is limited.

15. A signal reading method for a solid-state image pickup device having a photoelectric conversion part performing photoelectric conversion on incident light, a comparison part connected to an output terminal of the photoelectric conversion part to compare an output voltage of the photoelectric conversion part with a specified reference voltage and produce an output signal representing a result of the comparison, a capacitive element one end of which is connected to the output terminal of the photoelectric conversion part, and a control line connected to the other end of the capacitive element, comprising:
  applying a first control voltage to the control line so as to make an electric potential at the output terminal of the photoelectric conversion part fall outside a transition region of the comparator during a signal storage period; and
  applying a second control voltage to the control line so as to make the electric potential at the output terminal of the photoelectric conversion part fall within the transition region of the comparator during a signal read period.

* * * * *